United States Patent [19]

Koontz

[11] 4,200,446

[45] Apr. 29, 1980

[54] GAS HEARTH ELECTRICAL HEATING SUPPLEMENT AND METHOD OF OPERATION

[75] Inventor: Harry S. Koontz, Pittsburgh, Pa.

[73] Assignee: PPG Industries, Inc., Pittsburgh, Pa.

[21] Appl. No.: 7,124

[22] Filed: Jan. 29, 1979

[51] Int. Cl.$^2$ .............................................. C03B 29/04
[52] U.S. Cl. .................................. 65/25 A; 65/167; 65/182 A; 65/DIG. 4
[58] Field of Search .................. 65/25 A, 167, 182 A, 65/DIG. 4

[56] References Cited

U.S. PATENT DOCUMENTS

| | | | |
|---|---|---|---|
| 3,293,015 | 12/1966 | Fredley et al. ...................... | 65/25 A |
| 3,338,697 | 8/1967 | McMaster et al. .................. | 65/25 A |
| 4,059,426 | 11/1977 | Starr .................................... | 65/25 A |
| 4,059,427 | 11/1977 | Starr et al. .......................... | 65/25 A |

*Primary Examiner*—Arthur D. Kellogg
*Attorney, Agent, or Firm*—Edward I. Mates

[57] ABSTRACT

In a gas hearth furnace having a gas hearth block provided with gas supply passages and exhaust passages for the circulation of hot gas that produces a gaseous support bed for glass sheets during thermal treatment, electric heating wire is supported within certain of said passages in position to heat gas passing therethrough with minimum interference to the movement of said gas through said passages to improve the thermal efficiency of said gas hearth block.

9 Claims, 7 Drawing Figures

GAS HEARTH ELECTRICAL HEATING SUPPLEMENT AND METHOD OF OPERATION

BACKGROUND OF THE INVENTION

1. Field of the Invention

This invention relates to furnaces for heating glass articles, in particular glass sheets, of the type wherein the glass sheets are subjected to blasts of hot gas to heat and support the glass on a layer of hot gas. Such furnaces are typically employed to heat the glass in preparation for tempering, bending, or other thermal treatment such as coating at an elevated temperature. Such furnaces incorporate apparatus known as a gas hearth for heating and supporting glass sheets.

Typically, in a gas hearth furnace, gas that is used to support and heat glass sheets is recirculated and reheated to a desired temperature within a gas recirculation system by a burner which uses natural gas or oil for energy. Since natural gas and oil are expected to become scarce in many area of the country in the near future, many of the presently existing gas hearth furnaces will probably have to use electricity as their primary source of energy. If electricity is used, the success in converting existing furnaces to electric energy, or in designing and building new furnaces that use electrical energy instead of fossil fuel energy such as oil or natural gas or coal, will depend upon electric heater designs that are efficient, inexpensive, durable, and easy to maintain.

Unless such conversion can be made, a considerable capital investment in gas hearth furnaces will have to be depreciated entirely. Under such circumstances, the economic burden of such a loss would be considerable.

2. Description of the Prior Art

In the past, electrical energy has been used to supplement energy from fossil fuels in typical gas hearth furnaces of the prior art, overhead electrical heaters have been used in combination with gas hearth support beds and gas hearth furnaces in U.S. Pat. No. 3,223,501 to James C. Fredley and George E. Sleighter, for example. U.S. Pat. No. 3,526,491 to Sharrock suggests incorporating heating elements in a gas hearth bed, particularly near the sides of a path of travel of glass sheets, in order to assist glass sheets to bend. In addition, U.S. Pat. No. 4,059,426 to Eugene W. Starr and U.S. Pat. No. 4,059,427 to Eugene W. Starr and George W. Misson use electrical energy to heat a tube for supplying hot furnace gases preferably in conjunction with an air flow amplifier utilizing the Coanda effect. Such electrical heating as provided in the past has not been sufficient to eliminate the use of other fossil fuels as a heat source for gas hearth furnaces, even though they do provide some improvement over the efficiency of earlier gas hearth furnaces.

A typical gas hearth furnace has a ceramic bed provided with one or more ceramic blocks that include an upper surface over which fluid or hot gas may flow to maintain the treated glass in spaced relationship thereto. A plurality of supply passages are provided within each ceramic block for supplying hot gas from a pressurized gas chamber to the upper surface of the gas hearth block. Other exhaust passages are provided within the gas hearth block for removing excess gas from the space between the upper surface of the block and the glass into an exhaust region where the exhausted gas is recirculated. As stated previously, the recirculation has included a reheating of the circulated hot gases in order to conserve energy. In addition, a blower has been utilized in the recirculating system to further improve the efficient operation of the energy supply.

SUMMARY OF THE INVENTION

It has now been found that the efficiency of the gas hearth block is even further improved by provided electric heating elements within at least some of the passages within the gas hearth block. A voltage supply source is adapted to be connected to electrical heating wires supported within at least some of these passages to provide a more efficient way of heating both the glass-supporting gas and the gas hearth block simultaneously. Such simultaneous heating provides better means of heating both the gas hearth block and the supply of gas provided through the gas supply passages to provide the bed of gas on which glass sheets are supported during their thermal treatment within the gas hearth furnace.

Existing gas hearth furnaces are provided with exhaust passages that extend parallel to the upper surface of the gas hearth block and have openings to the sides of the gas hearth block which facilitate the insertion of electric heating wire to be supported within the exhaust passages. However, should future gas hearth furnaces be required, the furnaces built from a new design can have electric heating wire supported within the gas supply passages to provide an even more efficient operation of supplying hot gas to provide the gaseous bed at the upper surface of the gas hearth block.

This and other benefits of the present invention will be noted when one has an opportunity to study a description of an embodiment of an existing gas hearth furnace modified according to one embodiment of the present invention and a further description of another embodiment of the present invention in which the apparatus is built without regard to preexisting structure.

DESCRIPTION OF THE DRAWINGS

In the drawings that form part of a description of an illustrative embodiment and a modification of the present invention and wherein like reference numbers are applied to like structural elements.

DESCRIPTION OF THE ILLUSTRATIVE EMBODIMENTS

Figure 1:
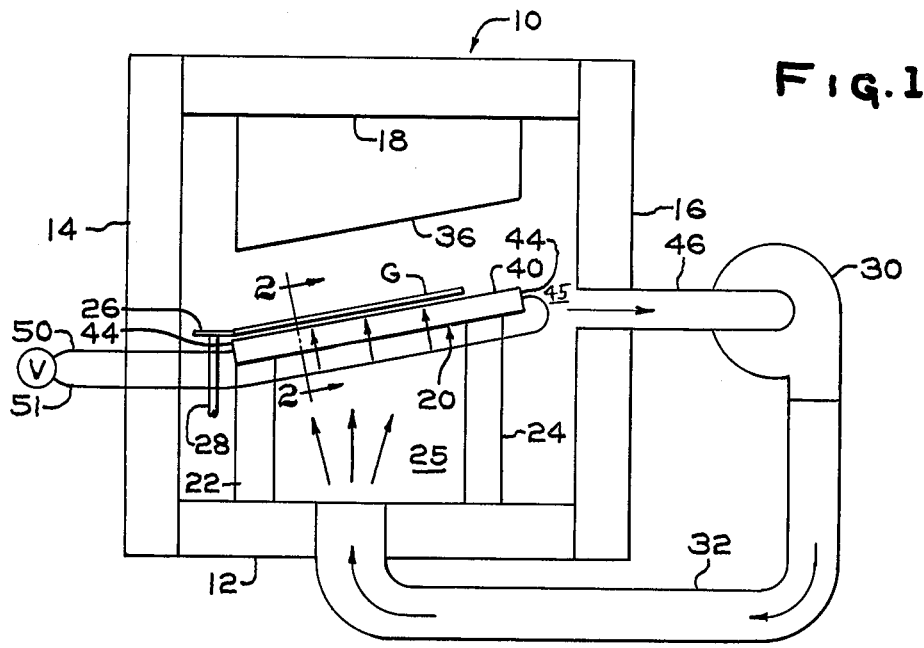
FIG. 1 is a fragmentary end view of a typical gas hearth having a typical exterior gas recirculation system provided with electrical heaters within certain gas exhaust passages in the gas hearth block in accordance with one embodiment of the present invention and is capable for incorporation in existing gas hearth-containing apparatus for thermally treating glass sheets.

Referring to the drawings, reference number 10 depicts a heating furnace. The furnace is of the elongated tunnel-type and comprises a floor 12, side walls 14 and 16 and a roof 18. A gas hearth block 20 of low expansion ceramic composition such as quartz is supported by vertical interior side walls 22 and 24 within the furnace 10. The hearth block 20 forms an apertured ceramic bed supported at an oblique angle on the vertical interior side walls 22 and 24, preferably at an angle of approximately 5 degrees to the horizontal. The gas hearth block 20, the interior side walls 22 and 24 and the furnace floor 12 form a chamber 25.

A plurality of driving discs 26 is located along the lower side of the gas hearth block 20. The driving discs 26 are rotated by driving shafts 28 which operate in unison from a common drive shaft (not shown) extending longitudinally along the lower side of the gas hearth block 20. A plurality of glass sheets G is supported in closely spaced relation over the upper surface of the gas hearth block 20 by a thin layer of hot gas that is blown under pressure from a blower 30 located exterior of the furnace 10 in the first embodiment of the invention depicted in FIG. 1 through a gas supply passage 32 and through the floor 12 of the furnace through a plurality of gas supply apertures 24 that extend through the thickness of the gas hearth block 20.

Gas is supplied under pressure from the blower 30 through the gas supply conduit 32 to pressurize the chamber 25. Pressurized gas so supplied flows from the chamber 25 through the thickness of the gas hearth block through the gas supply apertures 34 to provide a thin layer of pressurized gas that supports the glass sheets G while the latter are engaged along their lower edges by the rotating driving discs 26 to propel the moving glass sheets through the heating furnace 10.

The furnace roof 18 supports a support structure whose lower portion supports a plurality of roof heaters 36. The latter are disposed in a plane parallel to the plane of support for the glass sheets G defined by the upper surface of the gas hearth block 20. The roof heaters may be of the electrical resistance type or may be gas heaters or any other well known type of heating element that is conventionally used to raise the temperature of the environment within a tunnel-type furnace.

The gas hearth block 20 is also provided with a series of exhaust passages 38 that extend downward from the upper surface 40 of the gas hearth block 20 into communication with transversely extending exhaust passages 42 that extend across the block 20 between its longitudinally extending side walls 44 and provide communication between the exhaust passages 38 and an exhaust region 45 within the furnace 10 and outside the gas hearth block 20. An additional conduit 46 extends through an aperture in the furnace side wall 16 to permit excess gas exhausted through the exhaust passages 38 and the transverse exhaust passages 42 and the apertures in the apertured side wall 44 of the ceramic bed 20 into the exhaust region to be removed from the furnace chamber and recirculated through the blower 30 to the pressurized gas chamber 25. If desired, a gas heater, usually included in conjunction with the blower 30 to reheat the gas that is recirculated for delivery to the chamber 25, may be omitted when the gas hearth block 20 is modified as recited hereinafter in the description of the present invention.

It is understood that the length of the furnace may comprise a plurality of gas hearth blocks 20 disposed in longitudinal end to end relation along the length of the furnace and that these may be provided with flat upper surfaces 40 or surfaces toward the downstream end of the furnace in the direction of glass sheet movement that gradually change in contour from a flat configuration to a curved configuration in case glass sheets are to be shaped while supported on the ceramic bed for heating as a preliminary to further heat-treatment.

Using a gas burner to reheat the gases recirculated through the system of the blower 30, the gas supply conduit 32 and the additional conduit 46 is not as efficient as would be desired. According to the present invention, which was first installed in an already existing furnace provided with exhaust passages that included relatively large transversely extending exhaust passages 42, an electrical heating wire 48 in the form of a continuous helix hugging the interior wall of each of the transverse exhaust passages 42 is provided in the upper portion of said passages 42 and is connected to a voltage source (not shown). When voltage is applied through the heating wires 48, the electrical resistance of the wires develops localized heat to heat the gas that is being exhausted through the transverse exhaust passages 42 for circulation through the exhaust region for redelivery via the blower 30 to the gas hearth block 20 in the manner discussed previously.

Figure 5:
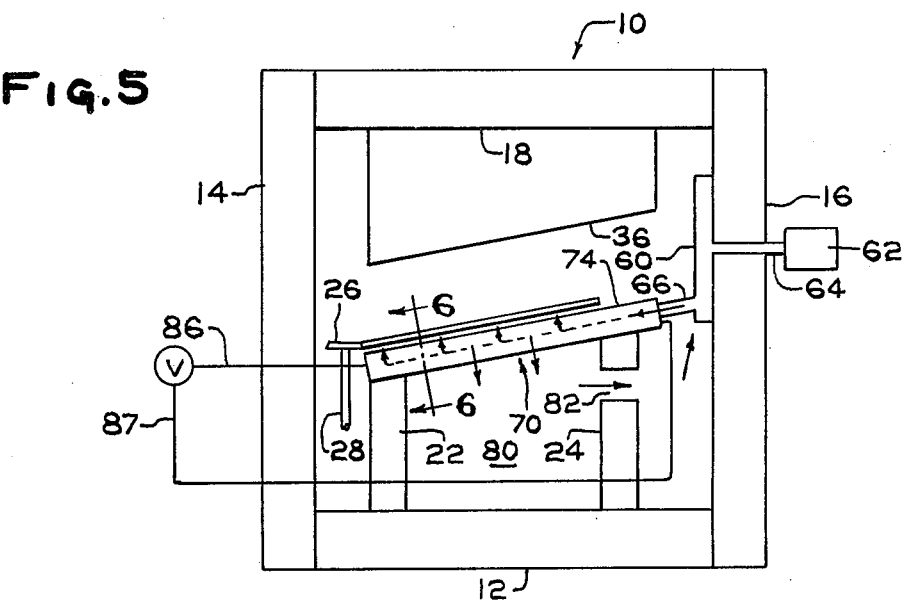
FIG. 5 is an end view similar to the view of FIG. 1 of an alternate embodiment of the present invention in which a modified gas hearth block has another embodiment of electrical heating elements incorporated within certain passages thereof according to the principles of the present invention and which block so modified is combined with a gas recirculating system located within a furnace containing the gas hearth block.
Figure 4:
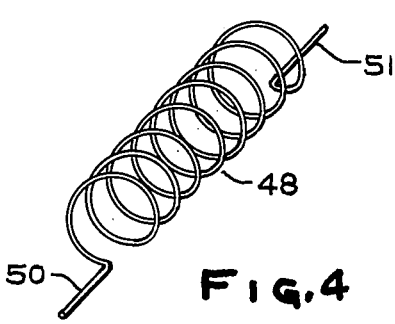
FIG. 4 is an isometric view of a portion of a heating wire coil, showing how it is arranged within a passage in the gas hearth block of the embodiment of FIG. 3.
Figure 7:
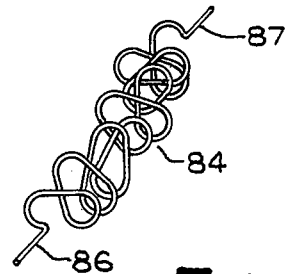
FIG. 7 is an isometric view similar to that of FIG. 4 of an alternate embodiment of heating element shown that is elliptically coiled in a special arrangement that may be used in either embodiment of FIG. 5 or FIG. 1 of the present invention.

The heating wires 48 are connected to lead lines 50 and return lead lines 51 that are connected to a voltage source V (shown schematically in FIGS. 1 and 5). The return lead lines 51 may be supported along the bottom surface of the gas hearth block 20 to facilitate their connection to the same voltage source V as the lead lines 50. A switch (not shown) and temperature responsive switching elements (also not shown) may be provided to control the amount of heat applied to the gases that are recirculated from the glass facing upper surface 40 of the gas hearth bed 20 to the chamber 25 through the blower 30 and the conduits 32 and 46.

Figure 2:
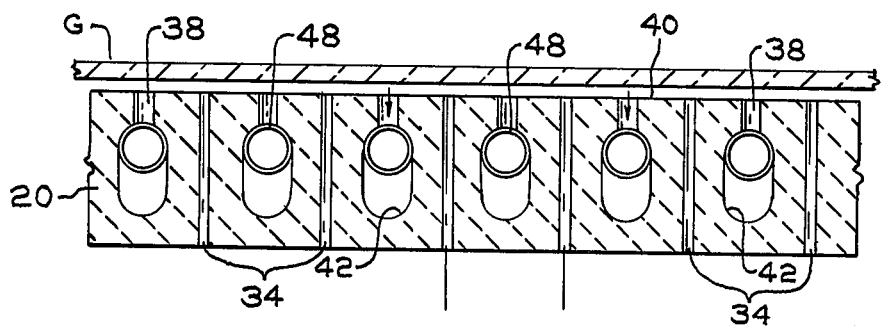
FIG. 2 is a fragmentary, cross-sectional view taken along the lines of 2—2 of FIG. 1 showing one embodiment of electrical heating elements inserted along the length of passages according to said one embodiment of the present invention.
Figure 3:
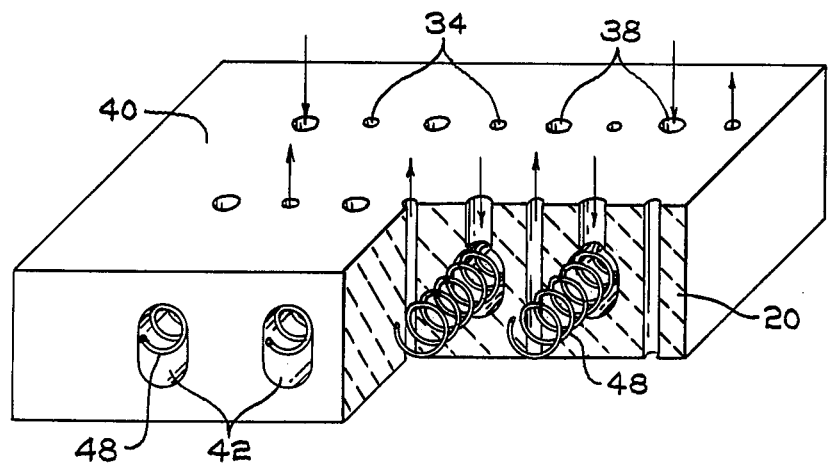
FIG. 3 is a fragmentary, isometric view of a portion of the modified gas hearth block as depicted in FIGS. 1 and 2.
Figure 6:
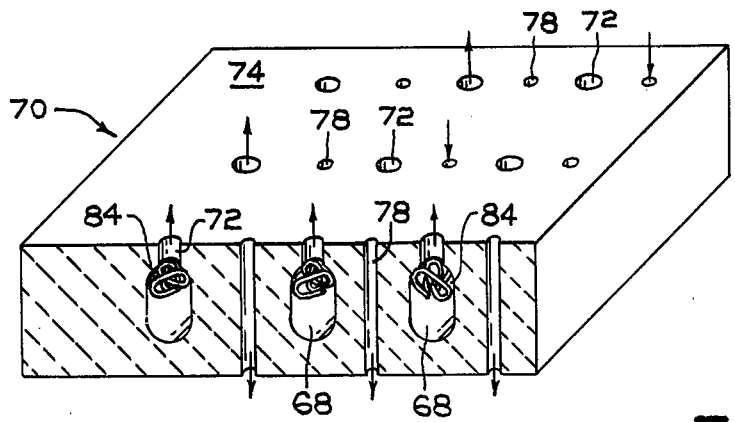
FIG. 6 is a view similar to FIG. 3 showing in greater detail how electrical heating elements are disposed in the gas supply circuits for heating gas that is used to float and support as well as heat glass sheets on their way to the glass support bed of the gas hearth.

The embodiment of FIGS. 5 and 6 has a recirculating fan 60 located within the furnace 10 and driven by a drive motor 62 through a drive shaft 64 that extends through the furnace side wall 16. The blower 60 blows recirculated gas through a plurality of transverse gas supply conduits 66, each communicating with one of a set of rows of transverse gas supply passages 68 (FIG. 6) within a gas hearth block 70 (that is a modified version of the gas hearth block depicted in FIGS. 1 to 3). The transverse gas supply passages 68 communicate with a plurality of gas supply openings 72 that extend upward into the upper surface 74 of the gas hearth block 70 of the alternate embodiment, which is also of a low expansion ceramic composition.

The ceramic gas hearth 70 is provided with a plurality of exhaust passages 78 that extend through the entire thickness of the bed. The gas hearth block 70 combines with side walls 22 and 24 to form an exhaust region 80. The inner side wall 24 is provided with apertures 82 along the length thereof to allow excess gas that is exhausted into the exhaust region 80 through the exhaust passages 78 extending through the thickness of the gas hearth block 70 to be recirculated via the space between the furnace side walls 14 and 16 and the plenum chamber side walls 22 and 24 for internal recirculation through the blower 60 into the transverse gas supply passages 68 and the gas supply openings 72 to provide a gaseous layer at the upper surface of the gas hearth block 20 to support glass sheets G traversing the furnace 10.

mm) wide and 16 inches (406.4 mm) long and approximately 4 inches (101.6 mm) high. The exhaust passages were approximately 3¼ inches (82.6 mm) high and ½ inch (12.7 mm) wide and were rounded at the upper and lower extremities. There were ten exhaust passages extending parallel to one another in a direction parallel to the upper surface of the gas hearth block tested. Thermocouples were used to measure the temperature within the fifth and the sixth exhaust passages along the width of the block. Ambient temperatures and air flows similar to a production furnace were simulated. Data taken both with and without a glass sheet suspended above the gas hearth block at various temperatures are reported in Table I that follows.

TABLE I

HEARTH BLOCK HEATER TEST DATA

| Sheet Suspended Above Block | TC # | Ambient Temp (°F.) Power Off | Ambient Temp (°F.) Power On | Plenum Temp. (°F.) | Coil Temp (°F.) Power Off | Coil Temp (°F.) Power On | Coil Temp (°F.) Sheet Above Block | V (Volts) | I (Amp) | Power Total Watts | Power Watts Sq. Ft. |
|---|---|---|---|---|---|---|---|---|---|---|---|
| NO | 5 | 1100 | 1210 | 1210 | 1240 | 1800 | — | | | | |
| NO | 6 | 1100 | 1210 | 1210 | 1240 | 1800 | — | 35 | 150 | 5250 | 3600 |
| YES | 5 | 1100 | 1210 | 1210 | 1230 | 1800 | 1700 | | | | |
| YES | 6 | 1100 | 1210 | 1210 | 1230 | 1800 | 1720 | 38 | 165 | 6270 | 4300 |
| NO | 5 | 1200 | 1280 | 1210 | 1420 | 1800 | — | | | | |
| NO | 6 | 1200 | 1280 | 1210 | 1420 | 1800 | — | 35 | 151 | 5285 | 3600 |
| YES | 5 | 1200 | 1280 | 1210 | 1420 | 1800 | 1720 | | | | |
| YES | 6 | 1200 | 1280 | 1210 | 1420 | 1800 | 1730 | 34 | 150 | 5100 | 3500 |
| NO | 5 | 1300 | 1340 | 1220 | 1440 | 1800 | — | | | | |
| NO | 6 | 1300 | 1340 | 1220 | 1440 | 1800 | — | 37 | 155 | 5735 | 4000 |
| YES | 5 | 1300 | 1340 | 1220 | 1440 | 1800 | 1700 | | | | |
| YES | 6 | 1300 | 1340 | 1220 | 1440 | 1800 | 1720 | 36 | 153 | 5508 | 3800 |
| NO | 5 | 1380 | 1400 | 1240 | 1500 | 2000 | — | 45 | 195 | 8775 | 6000 |
| NO | 6 | 1380 | 1400 | 1240 | 1500 | 2000 | — | | | | |
| NO | 5 | 1380 | 1390 | 1240 | 1500 | 1860 | — | 37 | 162 | 5994 | 4100 |
| NO | 6 | 1380 | 1390 | 1240 | 1500 | 1860 | — | | | | |
| YES | 5 | 1380 | 1390 | 1240 | 1500 | 1860 | — | 37 | 162 | 5994 | 4100 |
| YES | 6 | 1380 | 1390 | 1240 | 1500 | 1860 | — | | | | |

In the alternate embodiment of the present invention, the transverse gas supply passages 68 support continuous heating wires 84 in the upper portions thereof so that recirculated gas that is transported through the transverse gas supply passages 68 passes through the heating wires 84 en route to the gas supply openings 72 so that they are heated on the way to support the glass sheet. In order to accomplish this, the heating wires 84 are of a modified helical shape wherein each individual loop of the wire is of elliptical configuration and the major axes of adjacent loops are oriented along different major axes of the ellipses forming the adjacent loops of the helix so that the walls of the transverse gas supply passages 68 are engaged in their upper portions at different orientations along their length. The heating wires 84 have lead lines 86 and 87 similar to the lead lines 50 and 51 attached to the ends of the heating wires 48 of the first embodiment.

Preferably, electrical heaters can be used both for the overhead heaters 36 to provide heat for the furnace cavity and additional electrical heat for the heating wires 48 or 84 for heating the recirculated gas. Electrical heat applied directly to the recirculating gases within the gas hearth block is more efficient to heat the recirculating gases than auxiliary gas burners as used in conjunction with blowers in the prior art.

In order to test the practicality of the present invention, tests of heat transfer were made using a gas hearth block testing facility located at the Glass Research Center of the assignee of the present invention. For the tests, electric heaters were placed in the exhaust air passages in a sample gas hearth block 15 inches (381

In essence, the results showed that a gas hearth block provided with an electric hearth block coil heater at a temperature of 1800° F. (982° C.) can supply between 3500 to 4300 watts per square foot of hearth block surface area. At temperatures above 1800° F. (982° C.), power levels as high as 6000 watts per square foot of surface area are possible.

It had previously been determined that an energy level of 2270 watts per square foot of hearth block surface area was needed to reheat recirculated air during the processing of glass sheets 34 inches (863.6 mm) wide, 76 inches (1930.4 mm) long and 3/16 inch (4.76 mm) thick.

Table I shows the experimental results obtained. The pertinent values to be compared with 2270 watts per square foot are the values of the power obtained in watts per square foot at the various coil temperatures at which experiments were performed with glass sheets suspended above the gas hearth block.

Gas hearth blocks are normally made from fused silica. This material has excellent thermal shock resistance provided that the formation of cristobalite is prevented. As long as fused silica is not exposed to temperatures above 1950° F. (1066° C.) for prolonged periods of time, cristobalite and the attendant loss of thermal shock resistance associated with the formation of cristobalite should not be a problem. Therefore, electric wire heaters used in gas hearth blocks of fused silica should be limited to an upper temperature of 1850° F. (1010° C.) in order to prevent the formation of cristobalite.

In the illustrative embodiments described previously, heating wires 48 of helical configuration are shown within exhaust passages 42 in the embodiment of FIGS. 1 to 4, whereas heating wires 84 comprising adjacent loops of modified elliptical configuration oriented along different major axes are shown within gas supply passages 68 in the embodiment of FIGS. 5 to 8. It is understood that either configuration of electrical heating wire may be installed in either exhaust passages and/or gas supply passages as is required for promoting optimal thermal efficiency for the gas hearth block.

This specification describes an illustrative preferred embodiment and certain modifications of the present invention. It is understood that various changes may be made without departing from the gist of the invention as defined in the claimed subject matter which follows.

I claim:

1. In a furnace for heating a sheet of glass while supported on a layer of gas comprising a gas hearth block, a plurality of gas supply passages extending through said gas hearth block and means to supply pressurized gas through said gas supply passages to an upper surface of said block to supply sufficient gas through said gas supply passages to said upper surface of said gas hearth block to provide said layer of gas on said upper surface, and a plurality of exhaust passages extending from said upper surface through said block to an exhaust region to exhaust excess gas through said gas hearth block to said exhaust region, the improvement comprising electric heating wire supported within at least some of said passages in position to heat gas moving therethrough with minimum interference to the movement of said gas through said passages containing said electric heating wire, and a voltage source adapted to be connected to said electric heating wire to supply electric current to said electric heating wire.

2. The improvement as in claim 1, wherein said electric heating wire is supported within at least some of said gas supply passages to heat at least some of said gas within said gas hearth block.

3. The improvement as in claim 1, wherein said electric heating wire is supported within at least some of said exhaust passages, to heat at least some of said gas within said gas hearth block and means is provided for recirculating said exhausted gas from said exhaust region to said pressurized gas chamber.

4. The improvement as in claim 1, wherein means is provided to recirculate said gas from said exhaust region to said gas supply passages.

5. The improvement as in claim 4, wherein the recirculating means is within said furnace.

6. In the method of heating and supporting a glass sheet by the gas hearth method in which hot gas is delivered under pressure to the upper surface of a gas hearth bed through gas supply passages within said bed at a rate sufficient to provide a layer of gas on said upper surface sufficient to support said glass sheet thereon and then excess of said gas is exhausted from said upper surface via exhaust passages within said bed, the improvement comprising electrically heating said gas within at least some of said passages while simultaneously electrically heating said gas hearth bed from within at least some of said passages.

7. The improvement as in claim 6, comprising electrically heating at least some of said gas supply passages.

8. The improvement as in claim 6, comprising electrically heating at least some of said exhaust passages and recirculating the gas heated during its passage through said at least some of said exhaust passages to said gas supply passages.

9. The improvement as in claim 7 or claim 8, wherein said gas supplied is air.

* * * * *